United States Patent [19]

Takaki

[11] Patent Number: 5,099,458
[45] Date of Patent: Mar. 24, 1992

[54] UNDERWATER DETECTION SYSTEM
[75] Inventor: Sumio Takaki, Nishinomiya, Japan
[73] Assignee: Furuno Electric Co., Ltd., Hyogo, Japan
[21] Appl. No.: 474,048
[22] PCT Filed: Sep. 4, 1989
[86] PCT No.: PCT/JP89/00910
  § 371 Date: Apr. 27, 1990
  § 102(e) Date: Apr. 27, 1990
[87] PCT Pub. No.: WO90/02958
  PCT Pub. Date: Mar. 22, 1990
[30] Foreign Application Priority Data
  Sep. 5, 1988 [JP] Japan ................. 63-222071
[51] Int. Cl.⁵ ............................. H04B 11/00
[52] U.S. Cl. .................... 367/134; 367/110
[58] Field of Search ............ 367/110, 111, 113, 134, 367/11

[56] References Cited
U.S. PATENT DOCUMENTS
4,104,609 8/1978 Minegishi et al. ............... 367/110
4,644,511 2/1987 Asakura .......................... 367/113

FOREIGN PATENT DOCUMENTS
61-068572 1/1986 Japan .
62-245174 10/1987 Japan .
63-050083 4/1988 Japan .

Primary Examiner—Daniel T. Pihulic

[57] ABSTRACT

The present invention relates to an underwater detection system which radiates ultrasonic wave search signals by a transmitter disposed at a first point in the water, receives echo signals resulting from the search signals to detect underwater conditions, transmits information representative of underwater conditions to a second point spaced from the first point, and receives and displays the information representative of underwater conditions by a receiving transducer and an indicator. The transmitter disposed at the first point has a transmission side memory for storing echo signals, a device for writing the echo signals into the transmission side memory at periods which become longer as time elapses from an instant at which an ultrasonic wave search signal is radiated and for reading the stored echo signals out of the transmission side memory at constant periods.

7 Claims, 3 Drawing Sheets

UNDERWATER DETECTION SYSTEM

TECHNICAL FIELD OF INVENTION

The present invention relates to an underwater detection system which radiates ultrasonic wave search signals and receives echo signals resulting from the search signals at a first position in the water to detect underwater conditions and transmits information representative of the underwater conditions to a second position spaced from the first position and displays the underwater conditions at the second position.

TECHNICAL BACKGROUND OF INVENTION

Conventionally, for example, with a bottom trawl fishing method, the obtaining of information relating to a fishing net "a" being dragged by a ship "d" such as a range from the fishing net "a" to the sea-bottom "b", a range from the net "a" to the water surface "c" and fish schools moving around the net, is shown in FIG. 4. In order to obtain the information, conventionally, a fish school detecting apparatus has been used as shown in FIG. 5.

With a conventional fish school detecting apparatus, a transmitter "g" is fixed at an upper portion of the mouth of the fishing net "a"; a receiver "h" is installed on the ship "d"; and further, the transmitter "g" is provided with two transmitting and receiving transducers "i1" and "i2" to produce echo signals obtained by radiating ultrasonic wave signals in up and down directions and to receive resultant echo signals therefrom respectively. The fishing net "a" is being dragged by the ship "d", and at the same time ultrasonic wave signals are emitted and echo signals are received alternately at time intervals by the transmitting and receiving transducers "i1" and "i2" at a fishing net side. Echo signals coming from the up and down directions with respect to the fishing net "a" and received thereby are supplied through an amplifier "j" to an AM modulator "k" (or an FM modulator) which modulates in amplitude the echo signals (or in frequency). The modulated echo signals are amplified by a power amplifier "m" and then are converted by means of a transmission transducer "n" to ultrasonic wave signals which propagate to a ship side. The signals transmitted from the net are received by a receiving transducer "p" of a receiver "h" installed on the ship "d". The echo signals received thereby are amplified by an amplifier "q" and then recorded by a recorder or displayed by a color monitor. The recorder and the color monitor are not shown.

The frequency bandwidth in relation to ultrasonic wave signals transmitted from a transmitter to a receiver is generally of a narrow frequency bandwidth determined by characteristics of an ultrasonic transducer. In addition, another limitation is imposed by a requirement that there has to be avoided mutual interferences with signals used by other ships and hence the frequency bandwidth can not be too broad.

With a bottom trawl fishing method, information in association with areas above and below of the net and in the neighborhood of the fishing net is most important. The farther a position goes away from the fishing net, the less the importance of information associating the point becomes. In other words, there is desired to obtain detailed information in association with narrow areas in the neighborhood of the fishing net (for example, bandlike areas above and below the fishing net, each having a vertical length of about 5 meter). There is not desired to obtain information in association with positions considerably far away from the ship, which is, however, desired to be obtained by scanning sonars and the like.

With prior art underwater detection apparatii, information produced in the neighborhood of the fishing net and obtained and other information produced in areas farther away therefrom are transmitted at the same information density. From a viewpoint of information quality, the necessary information is inadequate and poor in association with the neighborhood of the transmitting and receiving transducer, and information produced in areas farther away from the transducers is excessive.

Thus, prior art apparatii have presented such drawbacks that record or display of necessary information becomes obscure due to inadequacy of the information produced in the neighborhood as well as narrow signal frequency bandwidth explained in the foregoing, when the information in association with the neighborhood of the fishing net is displayed or recorded.

The present invention is created in order to solve the drawbacks. An object of the present invention is to clearly record or display the information produced in the neighborhood of the fishing net by using the same narrow transmission bandwidth as with prior art apparatii so that signal interference with signals transmitted by other ships is not realized and by transmitting the information in association with the neighborhood of the fishing net at an increased density of information.

DISCLOSURE OF INVENTION

In order to attain the foregoing object, the present invention provides an underwater detection system which is constructed as in the following.

An underwater detection system according to the present invention uses a transmitter comprising a transmission side memory for storing the echo signals produced by a transmitting and receiving transducer, means for writing the echo signals into the transmission side memory in a manner that periods for writing the echo signals thereinto become longer as time goes on from a time instant at which an ultrasonic wave search signal is radiated, and means for reading the stored signals out of the transmission side memory at constant periods.

With the construction of the system in the foregoing, when echo signals obtained by the transmitting and receiving transducer are written into the transmission side memory, periods for writing the echo signals are varied in a time axis in a manner that the periods are shorter immediately after a search signal is radiated and the periods become longer as time goes on thereafter. As a result, the nearer points at which echo signals are produced with respect to the fishing net the finer in time resolution the echo signals are stored in the transmission side memory, and the farther points at which echo signals are produced with respect thereto the coarser in time resolution the echo signals are stored in the transmission side memory. The echo signals stored in the transmission side memory are read out therefrom at constant periods and are transmitted to a receiver.

Thus, although the same narrow transmission frequency bandwidth is used as with conventional apparatuses, echo signals produced in the neighborhood of the fishing net and obtained are expanded in time by a transmitter before transmission thereof in advance, and echo signals produced in areas farther away from the fishing net are compressed in time by the transmitter before transmission thereof in advance. This makes it possible to transmit the echo signals produced in the neighborhood of the fishing net at an increased information density without unnecessarily extending signal transmission time.

BRIEF DESCRIPTION OF INVENTION

FIG. 1 and FIG. 3 show embodiments according to the present invention;

FIG. 3 shows a block diagram of a receiver according to another embodiment.

EMBODIMENTS

Figure 1A:
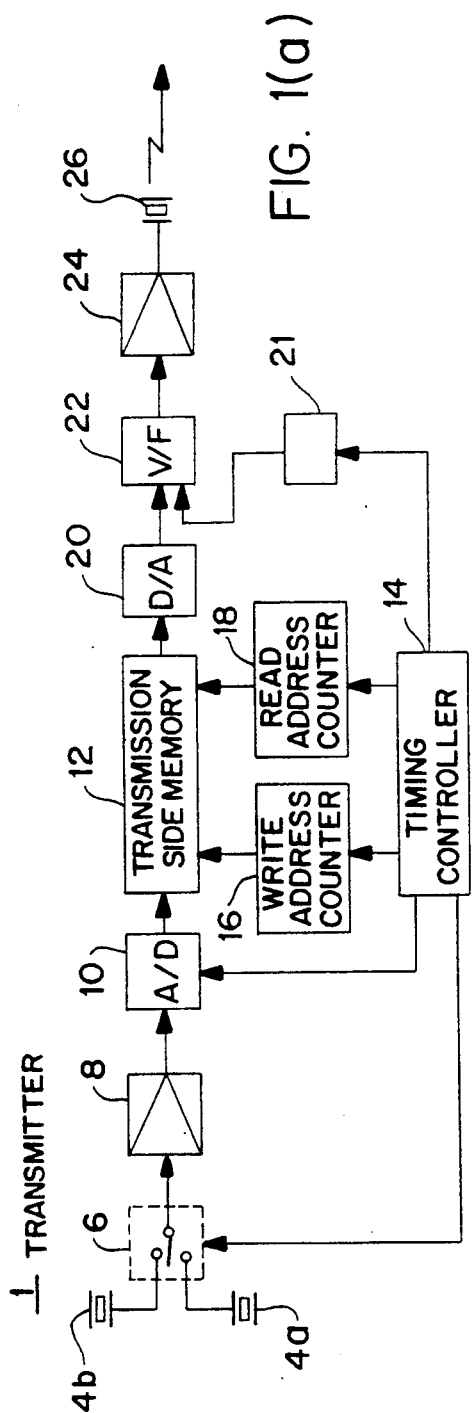
FIG. 1(a) shows a block diagram of a transmitter of an underwater detection system.
Figure 1B:
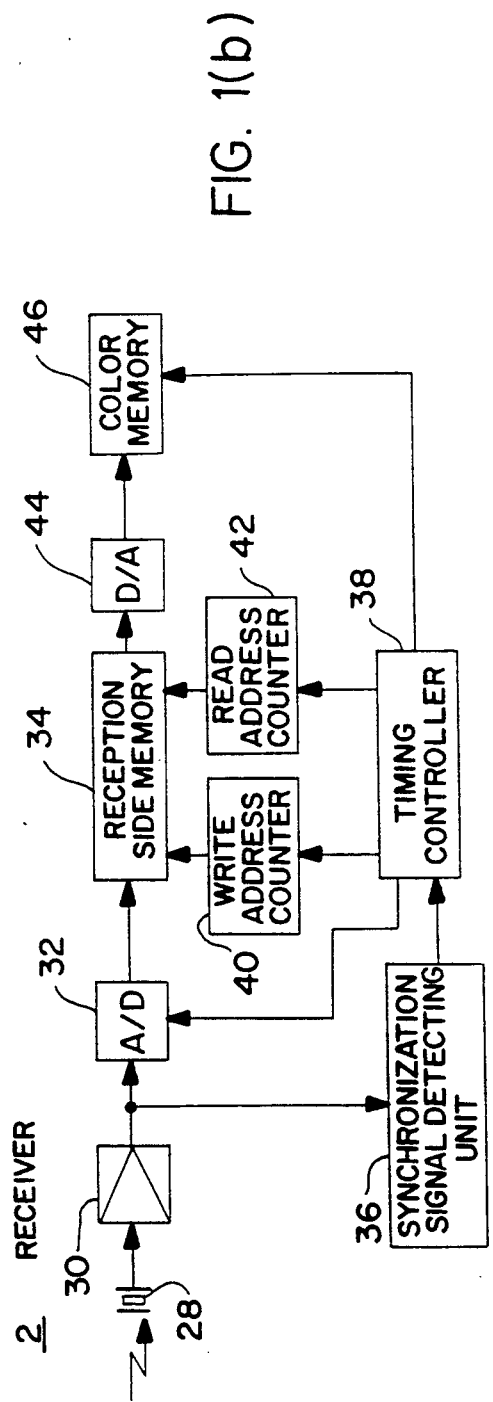
FIG. 1(b) shows a block diagram of a receiver of the underwater detection system.

FIG. 1(a) shows a block diagram of a transmitter of an underwater detection system according to an embodiment of the present invention, and FIG. 1(b) shows a block diagram of a receiver of the detection system. Referring to the figures, "1" represents a transmitter fixed at an upper portion of the mouth of a fishing net. "2" is a receiver installed in the ship. The transmitter 1 is provided with transmitting and receiving transducers 4a and 4b which radiate ultrasonic wave signals in up and down directions respectively and receive echo signals therefrom to produce signals. "6" represents a switching circuit for selecting one of the transmitting and receiving transducers 4a and 4b. "8" is a preamplifier; "10" is an A/D converter having logarithmic compression characteristics for converting echo signals from analog to digital signals; and "12" is a transmission side memory for storing A/D converted echo signals. "14" represents a timing controller which produces sampling pulses supplied to the A/D converter 10, keying pulses supplied to the transmitting and receiving transducers 4a and 4b, switching pulses supplied to the switching circuit 6, synchronization signals for synchronizing the transmitter 1 with the receiver 2 in transmitting signals from the transmitter to the receiver and clock signals for writing echo signals into the transmission side memory 12 and reading stored signals therefrom. "16" is a write address counter for producing, in response to clock signals supplied from the timing controller 14, signals representative of addresses identifying memory elements of the transmission side memory 12 in writing signals thereinto. "18" is a read address counter for producing, in response to clock signals supplied from the timing controller 14, signals representative of addresses for identifying memory elements in reading stored signals therefrom.

With this embodiment, the timing controller 14 and the write address counter 16 form a period varying means which varies time periods for writing echo signals into memory elements of the transmission side memory 12 as time elapses from an instant at which an ultrasonic wave search signal is radiated. The timing controller 14 and the read address counter 18 form means for reading signals stored in the transmission side memory 12 therefrom at constant periods.

"20" represents a D/A converter for converting the echo signals, into a digital form, read out from the transmission side memory 12 to analog signals; "21" is a synchronization signal generator for producing synchronization signals; "22" is a V/F converter for adding synchronization signals supplied from the synchronization signal generator 21 to D/A converted echo signals and for converting the resultant voltage signals to frequency signals; "24" is a power amplifier; and "26" is a transmission transducer for converting the echo signals to ultrasonic wave and emitting the converted signals.

While, "28" represents a reception transducer for receiving the echo signals transmitted from the transmitter 1; "30" is an amplifier; "32" is an A/D converter for converting the received echo signals from analog form to digital signals; and "34" is a reception side memory for storing the echo signals. "36" is a synchronization signal detecting unit for detecting a synchronization signal contained in the echo signals passed through the amplifier and for producing a driving pulse. "38" represents a timing controller which produces, in response to the driving pulse supplied from the synchronization signal detecting unit 36, sampling pulses supplied to the A/D converter 32, clock signals for writing or reading the echo signals into or out of the reception side memory 34 and a raster scan start pulse supplied to a color monitor 46 which will be explained below. "40" and "42" are a write address counter and a read address counter for producing, in response to clock signals supplied from the timing controller 38, signals representative of addresses of memory elements of the reception side memory 34 in writing signals thereinto and in reading stored signals therefrom respectively. With this embodiment, the timing controller 38 and the write address counter 40 form writing means for writing the echo signals into the reception side memory 34 at a constant time period corresponding to the time period for reading the stored signals from the transmission side memory 14. The timing controller 38 and the read address counter 42 form reading means for reading the stored signals from the reception side memory 34 at time periods corresponding to the time periods for writing the echo signals into the transmission side memory 12.

"44" represents a D/A converter having inverse logarithmic expansion characteristics which converts the digitized echo signals read out from the reception side memory 34 to analog signals. "46" is a color monitor as an indicator.

Figure 2:
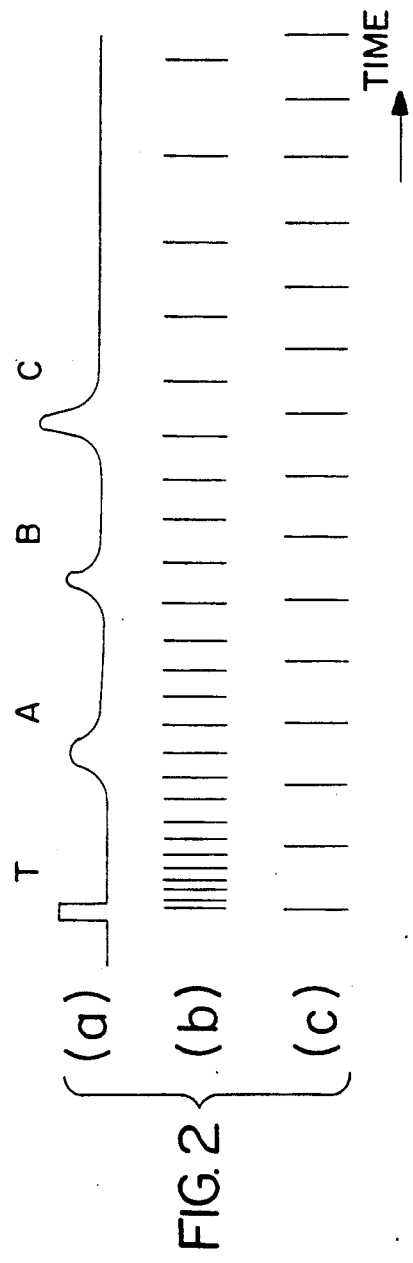
FIG. 2 shows a time chart for explaining the operation of the underwater detection system.

Next, the operation of the underwater detection system constructed as in the foregoing will be explained by referring to a time chart shown in FIG. 2.

The respective transmitting and receiving transducers 4a and 4b are alternately driven by keying pulses "T" supplied from the timing controller 14 to radiate ultrasonic wave signals at predetermined time intervals. Echo signals are received by the respective transmitting and receiving transducers 4a and 4b so that there will be produced echo signals containing information representative of underwater conditions above and below the fishing net. For instance, echo signals received by the downward-looking transmitting and receiving transducer 4a contain information representative of a fish school "A", a lower portion "B" of the mouth of the fishing net, the seabed "C" and the like, as shown in FIG. 2(A). The echo signals are supplied through the amplifier 8 to the A/D converter 10 in which the echo signals in an analog form are converted to digital signals and at the same time amplitude levels of the echo signals are logarithmicly compressed. The resultant A/D converted echo signals are then supplied to the transmission side memory 12.

The timing controller 14 starts to produce clock pulse signals at a time instant when the transmitting and receiving transducer 4a or 4b is keyed. Occurrence periods of the clock pulse signals for writing the echo signals into the memory are varied in such a time divisional fashion that occurrence periods for writing the signals immediately after a search signal is radiated are short and the periods become longer as time goes on, as shown in FIG. 2(b). The write address counter 16 increases its count value in response to each of the write clock pulses, thereby varying write addresses for identifying memory elements of the transmission side memory 12, into which echo signals are written accordingly. As a result, the closer points at which echo signals are produced with respect to the fishing net, the finer in time resolution the echo signals are stored in the transmission side memory 12, and the farther points at which echo signals are produced with respect to the fishing net, the coarser in time resolution echo signals are stored in the memory.

After all the echo signals are written into the transmission side memory 12, read clock pulses are produced from the timing controller 14 at a constant time period as shown in FIG. 2(C) so that the echo signals stored in the transmission side memory 12 are taken out of memory elements thereof in the order of address of memory elements identified by the address counter 18. The echo signals are supplied through the D/A converter 20, the V/F converter 22 and the power amplifier 24 to the transmission transducer 26 which converts the echo signals to ultrasonic wave signals and transmits the signals to the receiver 2.

The echo signals transmitted from the transmitter 1 are received by the reception transducer 28 of the receiver 2 installed in the ship and are amplified by the amplifier 30 which also converts the frequency of the echo signals to voltage signals. The converted voltage signals are supplied to the A/D converter 32 and to the synchronization signal detecting unit 36. The synchronization signal detecting unit 36 derives a synchronization signal contained in the received echo signals and produces a driving pulse. The timing controller 38 produces, in response to the driving pulse, sampling pulses supplied to the A/D converter 32 and write clock signals. The write clock signals are of a constant period in proportion to the time period of the read clock signals for reading stored signals from the transmission side memory 12 (refer to FIG. 2(C)). As a result, the echo signals in an analog form are converted to digital signals, and the count value of the write address counter 40 is increased in response to each of the write clock signals. The digitized echo signals are written into the reception side memory 34 in response to variation of the count value for identifying addresses of memory elements thereof.

After all the echo signals are written into the reception side memory 34, there is produced from the timing controller 38 and supplied to the color monitor 46 a start pulse for initiating raster sweep thereof and also produced therefrom read clock signals having occurrence periods corresponding to the occurrence periods of the write clock signals supplied to the transmission side memory 12. In other words, occurrence periods of the read clock signals are varied in such a manner in a time axis that the periods are shorter in early stages and become longer as time goes on. Consequently, the echo signals once stored in the transmission side memory 12 are read out in the order of address of memory elements identified by the address counter 42. The echo signals in a digital form are converted to analog signals by means of the D/A converter 44, and at the same time amplitude levels of the echo signals are expanded inverselogarithmically. The D/A converted echo signals are indicated by the color monitor 46.

According to the present invention, although transmission frequency bandwidth is of the same narrow bandwidth as with prior art underwater detection systems, echo signals produced in the neighborhood of the fishing net are expanded in time before the signals are transmitted by the transmitter 1, and the echo signals received by the receiver 2 are compressed in time. This makes it possible to transmit the echo signals produced in the neighborhood of the fishing net at an increased infomation density, without requiring unnecessarily longer time for transmission of all the signals.

Further, with the foregoing embodiment, echo signals are logarithmically compressed by means of the A/D converter 10 in the transmitter 1 and are inverselogarithmically expanded by the D/A converter 44 in the receiver so that apparent frequency bandwidth in relation to the echo signals is further expanded and hence S/N ratio can be substantially improved.

It should be noted that although, with the foregoing embodiment according to the present invention, both the frequency of the write clock signals for writing echo signals into the transmission side memory 12 and the frequency of the read clock signals for reading stored signals out of the reception side memory 34 are varied continuously and linearly, the frequency of the clock signals can be varied stepwise at time intervals. This method allows a digital circuit to be used to produce the clock signals and makes it easier to attain an object that no adjustment is required of the apparatus.

Figure 3:
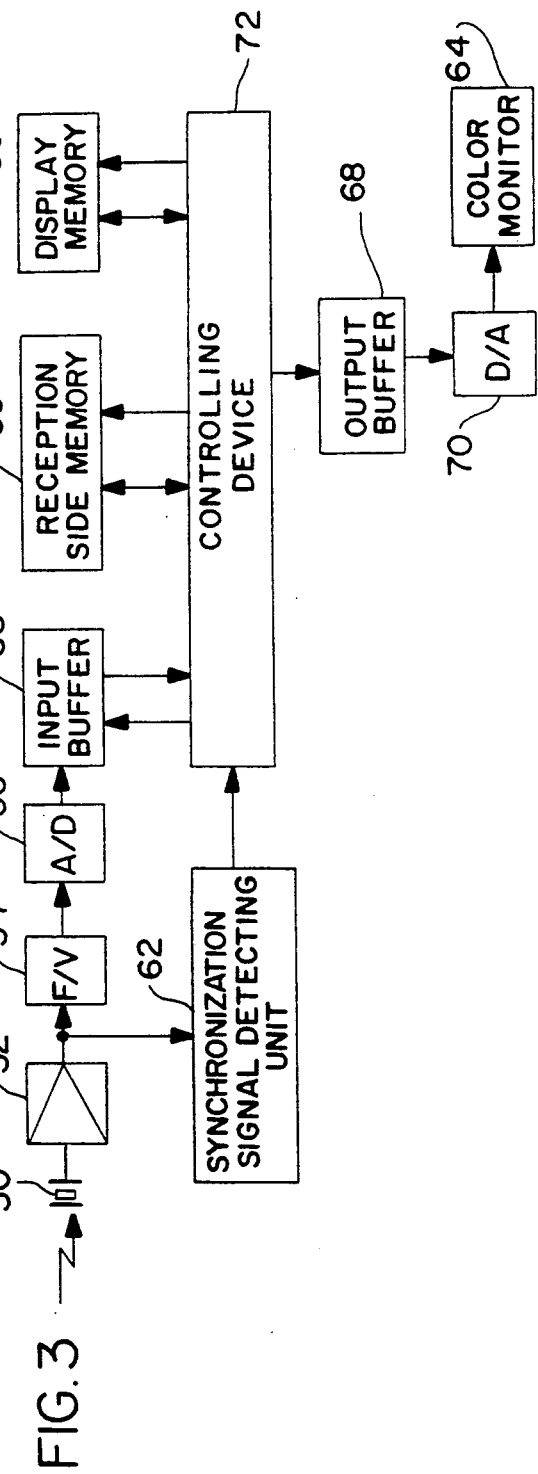
Figure 4:
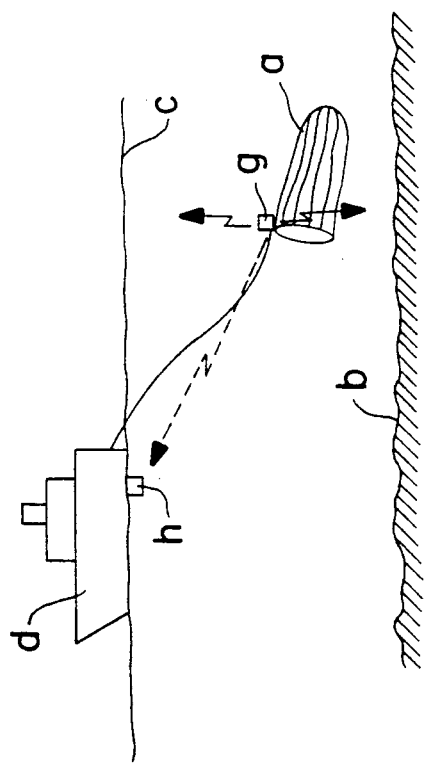
FIG. 4 is a drawing for explaining a bottom trawl fishing method.
Figure 5:
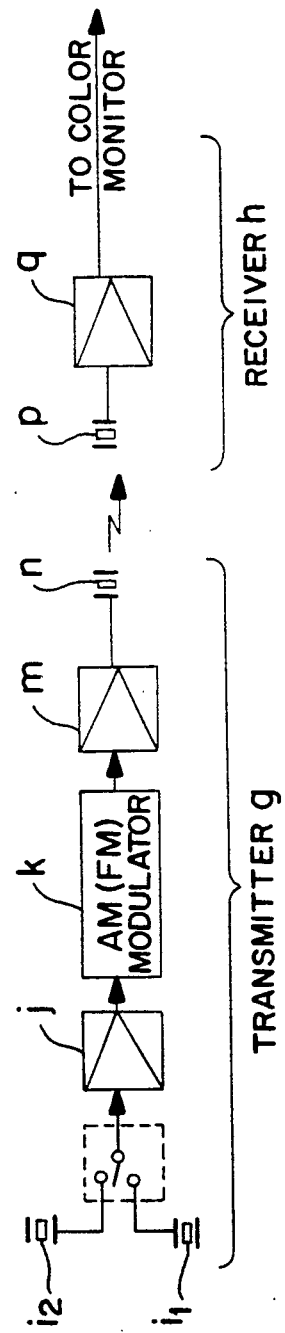
FIG. 5 is a block diagram of a conventional underwater detection system.

FIG. 3 shows a block diagram of another embodiment of a receiver.

Referring to the figure, "50" represents a reception transducer; "52" is an amplifier; "54" is an F/V converter; "56" is an A/D converter; "58" is an input buffer circuit; and "60" is a reception side memory. "62" represents a synchronization signal detecting unit; "64" is a color monitor as an indicator; "66" is a display memory having a memory capacity corresponding to the number of picture elements of the color monitor; "68" is an output buffer circuit; "70" is a D/A converter; and "72" is a controlling device. The controlling device 72 controls, in response to a driving pulse supplied from the synchronization signal detecting unit 62, timing of operations for producing sampling pulse signals supplied to the A/D converter 56, for writing or reading echo signals into or out of the respective memories 60 and 66 and for operating the input buffer circuit 58 and the output buffer circuit 68. With this embodiment, the controlling device 72 provides means for writing the echo signals stored in the reception side memory 60 into memory elements of the display memory 66 addresses of which correspond to distances between the transmitting and receiving transducers 4a or 4b and points at which the echo signals are produced.

With the construction of the embodiment shown in FIG. 3, the echo signals produced by the receiving transducer are amplified by the amplifier 52 and then are supplied to the F/V converter 54 and to the synchronization signal detecting unit 62. In response to a synchronization signal derived by the synchronization signal detecting unit 62, the controlling device 72 drives the A/D converter 56 so that output signals of the F/V converter 54 are converted to digital signals at a constant sampling frequency. Then, clock signals are supplied to the input buffer circuit 58 so that the echo signals are taken into the buffer circuit 58. Each time data signals of a predetermined amount are written into the input buffer circuit 58, the controlling device 72 transfers the data signals to the reception side memory 60 to be stored therein.

When data signals of a predetermined amount are written into the reception side memory 60, the controlling device 72 transfers the echo signal data stored in the reception side memory 60 to the display memory 66. In this case, the controlling device 72 writes echo signals into memory elements of the display memory 66 addresses of which correspond to distances between the transmitting and receiving transducers 4a and 4b and points at which the echo signals are produced, thereby making distances displayed on the display surface of the indicator correspond to the actual distances to points at which echo signals are produced from the transmitting and receiving transducers. In a case that an area to be displayed is too large and hence all the data stored in the reception side memory 60 can not be transferred to the display memory 66, data are derived from memory elements thereof appropriately selected. As a result, the data stored in the display memory 66 are taken out by the controlling device 72 therefrom and supplied to the color monitor 64 to be displayed in a manner that ranges of echoes displayed correspond linearly to actual distances between the transmitting and receiving transducers 4a and 4b to points at which the echoes are produced.

According to the present invention, although the transmission bandwidth is kept narrow in the same way as with conventional apparatii in order to avoid signal interference with signals used by other ships, echo signals produced in the neighborhood of the fishing net can be transmitted at an increased density of information. This produces a result that the information in association with the neighborhood of the fishing net is more clearly recorded or displayed.

I claim:

1. An underwater detection system having a transmitter being at a first position in water and transmitting information resulting from radiating and receiving ultrasonic wave signals and representative of underwater conditions in a neighborhood of the first position, and a receiver disposed at a second position spaced apart from the first position and receiving the information from the transmitter, the transmitter provided with a transmitting and receiving transducer for radiating ultrasonic wave search signals and receiving echo signals resulting from the search signals and the receiver provided with an indicator for displaying the received information, the transmitter comprising:
   a transmission side memory for storing echo signals produced by the transmitting and receiving transducer;
   means for writing the echo signals into the transmission side memory in a manner that periods for writing the echo signals into the memory become longer as time elapses from an instant at which an ultrasonic wave search signal is radiated; and
   means for reading the echo signals stored in the transmission side memory at constant periods and for transmitting the signals to the second position.

2. The underwater detection system as claimed in claim 1 wherein the receiver comprises:
   a reception side memory for storing the echo signals read from the transmission side memory;
   means for writing the echo signals into the reception side memory at constant periods; and
   means for reading the echo signals stored in the reception side memory at periods corresponding to the periods for writing the echo signals into the transmission side memory.

3. The underwater detection system as claimed in claim 1 wherein the receiver comprises:
   a reception side memory for storing the echo signals read from the transmission side memory;
   means for writing the echo signals into the reception side memory at constant periods;
   a display memory having a memory capacity corresponding to a number of picture elements of an indicator; and
   means for writing the echo signals stored in the reception side memory into memory elements of said display memory having addresses corresponding to distances between the transmitting and receiving transducer and points at which the echo signals are produced.

4. The underwater detection system as claimed in claim 1 wherein the receiver is installed on a ship, and the transmitter is fixed at a fishing net dragged by the ship.

5. The underwater detection system as claimed in claim 4 wherein the transmitting and receiving transducer of the transmitter radiates ultrasonic wave signals in a down direction with respect to the transmitting and receiving transducer and receiver echo signals therefrom.

6. The underwater detection system as claimed in claim 4 wherein the transmitting and receiving transducer of the transmitter radiates ultrasonic wave signals in up and down directions with respect to the transmitting and receiving transducer and receives echo signals therefrom.

7. A transmitter disposed in the water comprising:
   a transmitting and receiving transducer for radiating ultrasonic wave search signals into water and receiving echo signals resulting from the search signals;
   a memory for storing the echo signals produced by the transmitting and receiving transducer;
   means for writing into said memory the echo signals supplied thereto in a manner that periods for writing the echo signals thereinto become longer as time elapses from an instant at which an ultrasonic wave search signal is radiated;
   means for reading the echo signals stored in said memory at constant periods; and
   a transmitting transducer for converting the echo signals read out of said memory into ultrasonic wave signals and for transmitting the converted signals.

* * * * *